June 8, 1954  F. BERMAN  2,680,325
DESK PLATE FOR AUTOMOBILES
Filed May 17, 1952  2 Sheets-Sheet 1
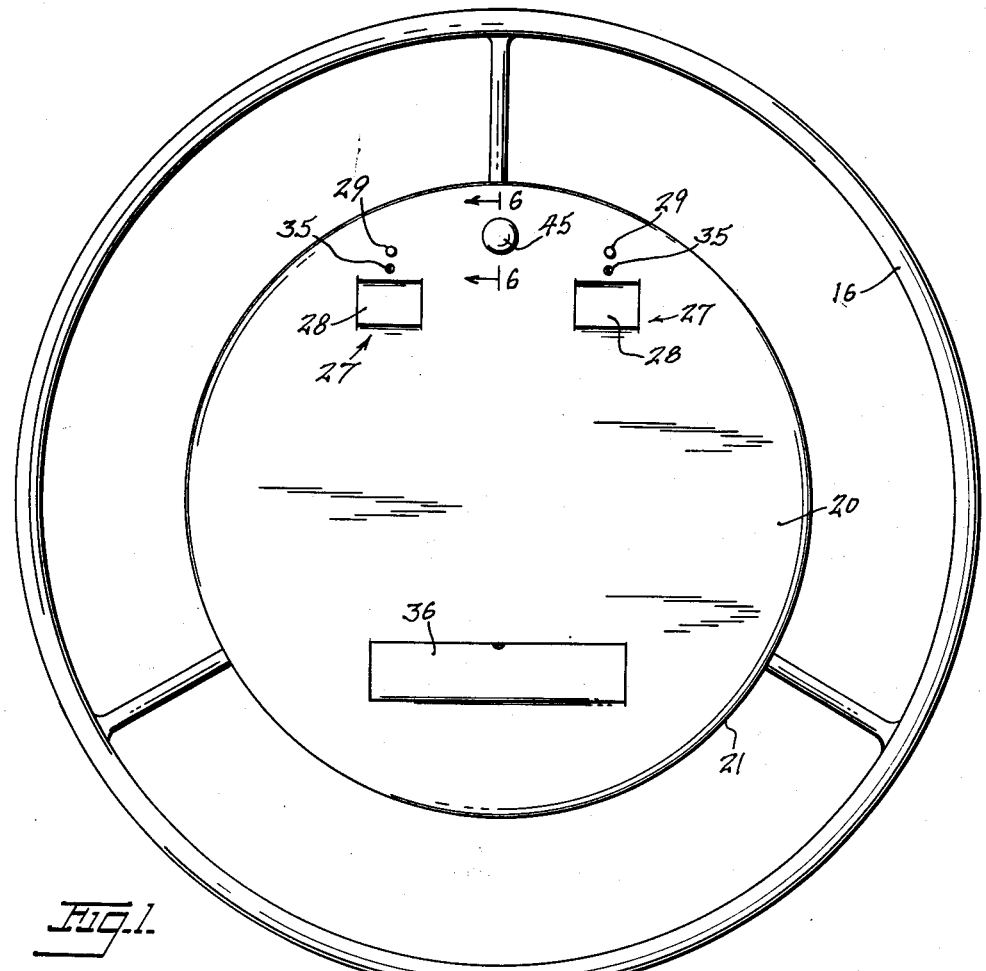
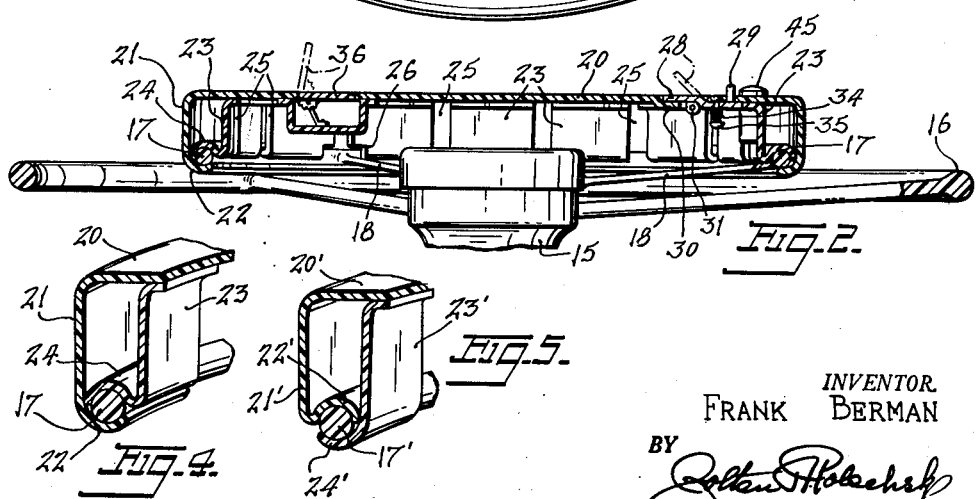
INVENTOR.
FRANK BERMAN
BY
ATTORNEY

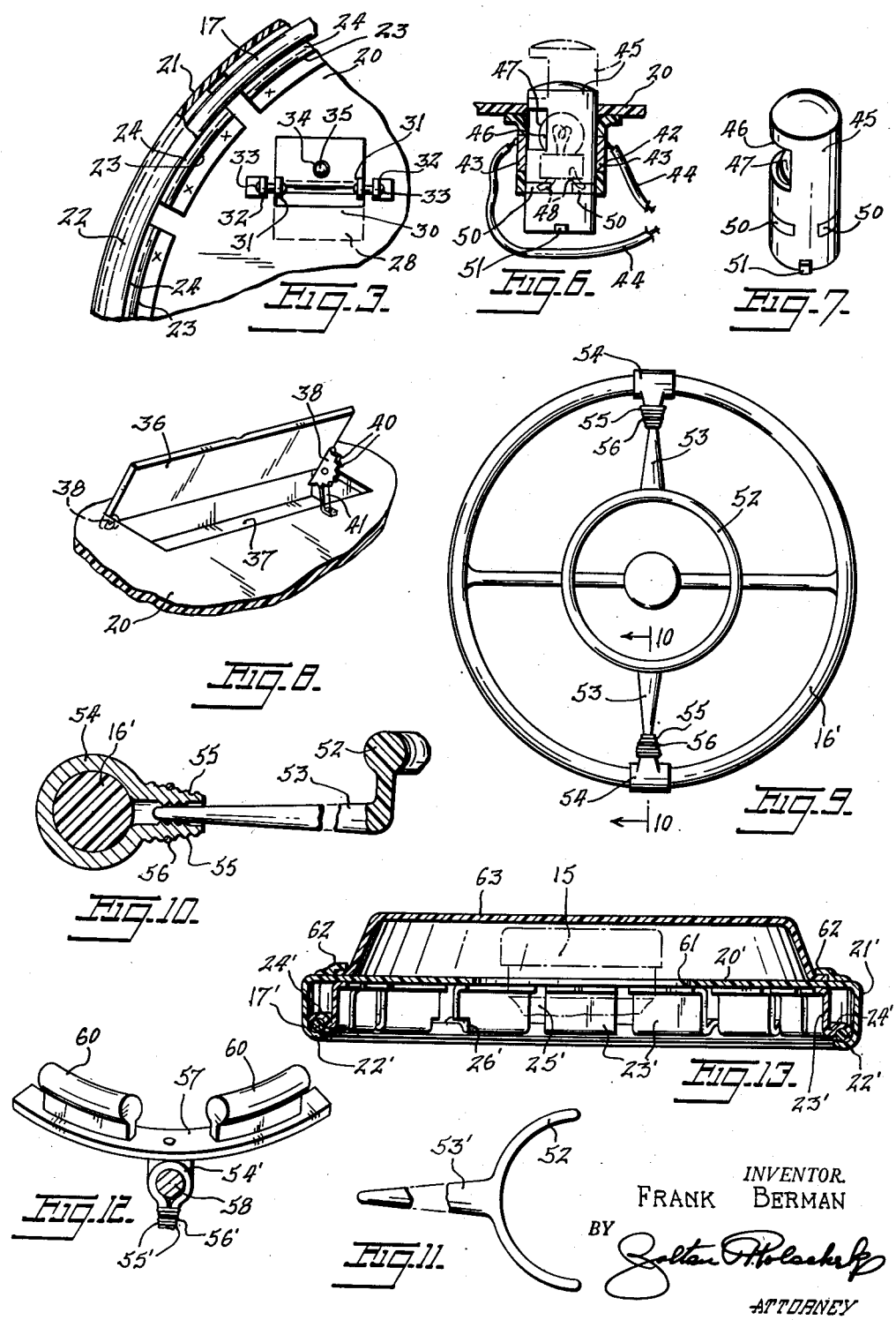

Patented June 8, 1954

2,680,325

UNITED STATES PATENT OFFICE 2,680,325

DESK PLATE FOR AUTOMOBILES

Frank Berman, Fair Lawn, N. J.

Application May 17, 1952, Serial No. 288,526

2 Claims. (Cl. 45—58)

This invention relates to a new and useful accessory for automotive vehicles and more particularly to a device for transforming the steering wheel of an automotive vehicle into a writing desk.

It has been found that persons utilizing a motor vehicle in the daily performance of their profession, for example, salesmen and deliverymen, are required to do considerable writing and for reading while at the wheel of their vehicle.

The principal object of the invention therefore is the provision of means for transforming the steering wheel of a motor vehicle into a writing desk.

Another object of the invention is to include in said means devices for securing a sheet or pad of paper in position for the same to be written on, a lamp for illuminating the surface of said paper when desired, and storage space for writing implements and the like.

Still another object of the invention is to provide for the mounting of said means on various types of steering wheels.

For further comprehension of the invention and of the objects and advantages thereof, reference will be had to the following description and accompanying drawings, and to the appended claims in which the various novel features of the invention are more particularly set forth.

On the accompanying drawings forming a material part of this disclosure:

Fig. 1 is an elevational view of the means of the invention as applied to a steering wheel having a horn ring mounted thereon.

Fig. 2 is a sectional view of the device of Fig. 1 with section being taken through substantially the center thereof.

Fig. 3 is a fragmentary view from beneath, of the device of Fig. 1.

Fig. 4 is an enlarged perspective sectional view of a portion of Fig. 2.

Fig. 5 is a view similar to Fig. 4 but illustrates a modified construction.

Fig. 6 is an enlarged sectional view on line 6—6 of Fig. 1.

Fig. 7 is an enlarged perspective view of the means shown in section in Fig. 6.

Fig. 8 is a fragmentary, enlarged perspective view of means shown also in Figs. 1 and 2.

Fig. 9 is an elevational view which illustrates means for attaching the device of Fig. 1 to a steering wheel having no horn ring.

Fig. 10 is an enlarged sectional view on line 10—10 of Fig. 9.

Fig. 11 is an elevational view of a modification of the means shown in Fig. 9.

Fig. 12 is a perspective view of means for mounting the device of Fig. 1 on the spokes of a steering wheel.

Fig. 13 is a sectional view similar to Fig. 2 but illustrates a modified construction.

Referring first to Figs. 1 to 5, the reference numeral 15 designates the steering column of an automotive vehicle, the numeral 16 designates a steering wheel secured to the head of said column and the numeral 17 designates a horn ring secured to the horn at the head of the column by spokes 18. The means for transforming the steering wheel into a writing desk comprise a circular plate 20 which may be of clear plastic material and which has a turned down peripheral flange 21 which serves as a stiffener and also to secure the plate atop horn ring 17. For this purpose the lower end of flange 21 is turned in arcuately as shown at 22 in Fig. 4 to embrace the underside of the horn ring. A second flange 23 concentric with flange 21 and located therewithin has an out-turned arcuate lower portion 24 situated above the portion 22 of flange 21 and embracing the upper face of horn ring 17. The space between the flange portions 22 and 24 preferably is such as to provide a tight fit of the two about the horn ring. Flange 23 may be integral with plate 20 or separately formed and secured thereto by cementing or the like as shown in the drawing. In order to facilitate the engagement of horn ring 17, inner flange 23 is slit vertically at intervals as indicated at 25. In order to accommodate the spokes of horn ring 17 cutouts 26 may be provided in both flanges.

As shown in Fig. 5 wherein like parts are given the same reference numerals as above with a prime added. The construction may be modified to have the flange portion 22' grip the upper face of the horn ring and the flange portion 24' grip the lower face of the ring.

In order to secure a sheet or a pad of paper atop plate 20 for the purpose of writing thereon a pair of clips 27 are formed flush with the plate. As shown in Figs. 1, 2 and 3 each said clip comprises a rectangular plate 28 offset at its center so that one end thereof underlies face plate 20 while the other end lies flush with said plate and rests on a depressed portion 30 thereof. Of course, an opening is provided in plate 20 to accommodate the clip plate 28. Plate 28 is provided at either end of the offset thereof with an ear 31 which cooperates with an ear 32 integral with or suitably secured to the plate 20. Pivot pins 33 extending between the ears 31 and 32 serve to pivotally support the plate 28 which is held in the full line, paper securing position shown in Fig. 2 by a spring 34. As shown, spring 34 is mounted on a pin 35 which passes through plate 28 and is suitably secured to plate 20, and acts between a head on said pin and the underside of plate 28. A second pin 29 secured to plate 28 and projecting through plate 20 permits the plate 28 being raised to the dot dash position of Fig. 2 to slip a sheet of paper therebeneath.

In order to provide a shelf like support for articles which it is not desired to secure in place by means of the clips 27, a rectangular opening in plate 20 located opposite the said clips, has a pivoted cover piece 36 which, when in its open position serves as a shelf. Conveniently, a compartment 32 for pencils and the like may be located beneath cover piece 36. At either end, cover piece 36 is provided with an ear 38 through which a pivot pin 39 extends into the adjacent wall of compartment 37. In order to maintain cover piece 36 in any desired open position for use as a shelf, one of the ears 38 is enlarged and provided with ratchet teeth 40 which cooperate with a detent spring 41 suitably secured to the floor of compartment 37.

In order to facilitate the use of plate 20 for writing and reading purposes when the same is in darkness or a dim light, means are provided to illuminate the surface thereof. The said means include a circular opening in plate 20 between the clips 27 and an open end cylinder 42 secured to the underside of plate 20 in alignment with the opening, see Figs. 1, 6 and 7. Cylinder 42 is constructed mainly of plastic or other electrically insulative material but on opposite sides is provided with conductive inserts 43 which are connected by wires 44 to a suitable source of electrical energy, say the battery of the auto vehicle. Slidably mounted in cylinder 42 is an opaque cylinder 45 of non-conductive material having near its upper end a window 46 through which light from a small electric lamp 47 suitably mounted within the cylinder projects. Preferably the mounting for lamp 47 is of standard design, but has the wires 48 extending therefrom electrically connected to conductive inserts 50 in the wall of cylinder 45. In order to prevent the cylinder 45 from being pulled up out of cylinder 42 the former is provided with extensions 52 at its lower end.

Normally cylinder 45 is in the lower position shown in Fig. 6 and lamp 47 is extinguished. However, when cylinder 45 is pulled upward the conductive inserts 50 come into contact with the inserts 43 and lamp 47 is lighted and illuminates the surface of plate 20.

It is evident therefore that the means of the invention are readily applicable to the steering wheel of an autovehicle to transform the latter into a writing desk.

In some instances the steering wheels of auto vehicles are not provided with horn rings as described above. In order to enable the mounting of plate 20 and its appurtenances on such steering wheels, the devices shown in Figs. 9 to 12 are provided. Referring first to Figs. 9 and 10 there is illustrated a steering wheel 16' having no horn ring. To perform the function of the horn ring in supporting plate 20 and its appurtenances there is provided a ring 52 of plastic or other material having the form shown for engagement between the gripping portions 22 and 24 of the flanges 21 and 23 of plate 20 shown in Figs. 2 and 4. Formed integrally with ring 52 but offset therebelow are a pair of diametrally opposed tails 53 which at their ends are secured to the rim of steering wheel 16'. Preferably, the means for securing the tails 53 to the steering wheel each include a strap 54 surrounding the rim of the wheel and formed at either end of the said strap a threaded semi-cone 55. As shown the semi-cones 55 embrace a tail 53 and are secured thereto by a ring 56 threaded onto the cones. It is believed evident that ring 52 serves in the same manner as the horn ring described above.

Referring now to Fig. 11, there is disclosed a half ring 52' having a single tail 53'. If desired this may be utilized in the same manner as the ring 52 just above described.

In Fig. 12 there is shown means for mounting the plate 20 and its appurtenances on the spokes of a steering wheel having no horn ring. As illustrated an arcuate strip 57 is secured to each spoke 58 of a steering wheel by a strap 54' which surrounds the spoke and is pinned to said strip at the center thereof.

Strap 54' is secured to spoke 58 in the same manner as the strap 54 described above and like parts are given the same reference numerals as in Figs. 9 and 10 with primes added. Secured atop strip 57 are a pair of ring sections 60 adapted to be engaged between the gripper portions 22 and 24 the same as the horn ring 17 or the ring 52 described above.

Evidently adapters of the sort shown in Fig. 12 secured to each spoke of a steering whel effectively support the ring 20 and its appurtenances.

Referring now to Fig. 13 there is disclosed means for adapting the device of the invention to steering wheels wherein the steering column interferes with the placement of a plate 20. In this figure like parts are given the same reference numerals as in Fig. 2 with primes added. As shown the plate 20' is provided with a large central opening 61 to accommodate the projecting steering column and also with a peripheral lip 62 beneath which the edge of an inverted saucer like plate 63 can be snapped. Obviously plate 63 provides a writing surface above the projecting steering column if desired plate 63 may be provided with the appurtenances of plate 20 in Figs. 1 and 2.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. Means for transforming an auto vehicle steering wheel having a horn ring into a writing desk comprising a circular plate, a peripheral flange extending downward from said plate and having an arcuate laterally extending lower portion embracing the underside of the said ring, a second flange concentric with the first but located therewithin and having an arcuate laterally extending lower portion embracing the upperside of the ring, a pair of clips for securing a sheet of paper on the surface of said plate, means for illuminating the surface of the plate, a shelf normally flush with said plate but adjustable to support articles on the plate, means for securing said shelf in adjusted position, and a compartment beneath said plate covered by said shelf when the same is flush with the plate.

2. Means for transforming an auto vehicle steering wheel ring into a writing desk comprising, a circular plate, a peripheral flange extending downward from said plate and having an arcuate laterally extending section embracing one side of said ring, and a second flange concentric with the first but located therewithin and having an arcuate laterally extending section embracing the other side of said ring.

References Cited in the file of this patent

UNITED STATES PATENTS

| Number | Name | Date |
|---|---|---|
| 1,717,433 | Bragg et al. | June 18, 1929 |
| 1,883,714 | Gray | Oct. 18, 1932 |
| 1,892,721 | Cardarelli | Jan. 3, 1933 |
| 1,977,507 | Edwards | Oct. 16, 1934 |
| 2,150,709 | Bake | Mar. 14, 1939 |
| 2,518,127 | Dobbs | Aug. 8, 1950 |